US006721139B2

(12) United States Patent
Gill

(10) Patent No.: US 6,721,139 B2
(45) Date of Patent: Apr. 13, 2004

(54) TUNNEL VALVE SENSOR WITH NARROW GAP FLUX GUIDE EMPLOYING A LAMINATION OF FEN AND NIFEMO

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 09/872,244

(22) Filed: May 31, 2001

(65) Prior Publication Data

US 2002/0181165 A1 Dec. 5, 2002

(51) Int. Cl.[7] ............................................... G11B 5/127
(52) U.S. Cl. ....................................................... 360/321
(58) Field of Search .......................................... 360/321

(56) References Cited

U.S. PATENT DOCUMENTS

| 4,489,357 A | 12/1984 | Van Ooijen et al. ........ 360/113 |
| 5,119,025 A | 6/1992 | Smith et al. ................ 324/252 |
| 5,142,426 A | 8/1992 | Re et al. ..................... 360/126 |
| 5,898,547 A | 4/1999 | Fontana, Jr. et al. ........ 360/113 |
| 5,930,087 A | 7/1999 | Brug et al. ................. 360/113 |
| 6,101,072 A | * 8/2000 | Hayashi ..................... 360/324 |

FOREIGN PATENT DOCUMENTS

| EP | 0 438 687 A1 | 7/1991 |
| JP | 60087412 | 5/1985 |
| JP | 60154603 | 8/1985 |
| JP | 6287034 | 9/1994 |
| JP | 7135111 | 5/1995 |
| JP | 7169023 | 7/1995 |
| JP | 8097487 | 4/1996 |
| JP | 8111011 | 4/1996 |
| JP | 9251612 | 9/1997 |

OTHER PUBLICATIONS

R. D. Hempstead et al, "Laminated shields for thin film recording heads", *IBM Technical Disclosure Bulletin*, vol. 18, No. 4, Sep. 1975.

* cited by examiner

*Primary Examiner*—George J. Letscher
(74) *Attorney, Agent, or Firm*—Ervin F. Johnston

(57) ABSTRACT

A tunnel valve sensor has a flux guide which has at least one iron nitride (FeN) layer and preferably a lamination of iron nitride (FeN) and nickel iron molybdenum (NiFeMo) layers wherein in the first instance the read gap is reduced and in the second instance the read gap is reduced and the sensitivity of the read head is increased.

26 Claims, 7 Drawing Sheets

TUNNEL VALVE SENSOR WITH NARROW GAP FLUX GUIDE EMPLOYING A LAMINATION OF FEN AND NIFEMO

BACKGROUND OF THE INVENTION

1. Field of the Invention

The present invention relates to a tunnel valve sensor with a narrow gap flux guide and, more particularly, to such a flux guide which has improved saturation magnetization.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

An exemplary high performance read head employs a tunnel valve sensor for sensing the magnetic field signals from the rotating magnetic disk. The sensor includes a nonmagnetic electrically nonconductive tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel valve sensor is located between ferromagnetic first and second shield layers. First and second leads, which may be the first and second shield layers, are connected to the tunnel valve sensor for conducting a sense current therethrough. The sense current is conducted perpendicular to the major film planes (CPP) of the sensor as contrasted to a spin valve sensor wherein the sense current is conducted parallel to the major film planes (CIP) of the tunnel valve sensor. A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the sense current is conducted through the sensor without magnetic field signals from the rotating magnetic disk.

When the magnetic moments of the pinned and free layers are parallel with respect to one another the resistance of the tunnel valve sensor to the sense current ($I_S$) is at a minimum and when their magnetic moments are antiparallel the resistance of the tunnel valve sensor to the sense current ($I_S$) is at a maximum. Changes in resistance of the tunnel valve sensor is a function of cos θ, where θ is the angle between the magnetic moments of the pinned and free layers. When the sense current ($I_S$) is conducted through the tunnel valve sensor, resistance changes, due to field signals from the rotating magnetic disk, cause potential changes that are detected and processed as playback signals. The sensitivity of the tunnel valve sensor is quantified as magnetoresistive coefficient dr/R where dr is the change in resistance of the tunnel valve sensor from minimum resistance (magnetic moments of free and pinned layers parallel) to maximum resistance (magnetic moments of the free and pinned layers antiparallel) and R is the resistance of the tunnel valve sensor at minimum resistance. The dr/R of a tunnel valve sensor can be on the order of 40% as compared to 10% for a spin valve sensor.

The first and second shield layers may engage the bottom and the top respectively of the tunnel valve sensor so that the first and second shield layers serve as leads for conducting the sense current ($I_S$) through the tunnel valve sensor perpendicular to the major planes of the layers of the tunnel valve sensor. The tunnel valve sensor has first and second side surfaces which are normal to the ABS. First and second hard bias layers abut the first and second side surfaces respectively of the tunnel valve sensor for longitudinally biasing the magnetic domains of the free layer. This longitudinal biasing maintains the magnetic moment of the free layer parallel to the ABS when the read head is in the quiescent condition.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel valve read head all of the layers are exposed at the ABS, namely first edges of each of the first shield layer, the seed layer, the free layer, the barrier layer, the pinned layer, the pinning layer and the second shield layer. Opposite edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers being smeared across the ABS to cause a short therebetween. Accordingly, there is a strong-felt need to construct magnetic head assemblies with tunnel valve heads without the risk of shorting between the free and pinned layers at the ABS due to lapping.

A scheme for preventing shorts across the barrier layer of the tunnel valve sensor is to recess the tunnel valve sensor within the head and provide a flux guide between the ABS and the sensor for guiding flux signals from the rotating magnetic disk to the sensor. Typically, the ferromagnetic material of the flux guide is required to be stabilized by hard bias layers on each side of the flux guide. The prior art ferromagnetic material employed for the flux guide is nickel iron (NiFe). Generally, the thickness of a nickel iron flux guide layer is 100 Å at the ABS in order to provide sufficient magnetization for detecting the field signals from the rotating magnetic disk. There is a strong-felt need to reduce this thickness in order to increase the linear read bit density of the read head. When the linear read bit density is increased more magnetic bits can be placed per linear inch along a track of the rotating magnetic disk which increases the storage capacity of the computer.

SUMMARY OF THE INVENTION

In the present invention the flux guide of the tunnel valve sensor includes an iron nitride (FeN) layer which has twice the magnetization of nickel iron (NiFe). In one embodiment of the invention the flux guide is a single layer of iron nitride with a thickness one-half of the prior art nickel iron layer. Accordingly, the single iron nitride flux guide layer can be 50 Å instead of 100 Å which reduces the read gap of the read head by 50 Å. As discussed hereinabove, this increases the linear read bit density of the read head. In a preferred embodiment, however, a second layer of nickel iron molybdenum (NiFeMo) is employed for decreasing the uniaxial anisotropy ($H_K$) of the flux guide. When the uniaxial anisotropy ($H_K$) is reduced the magnetic moment of the flux guide is more responsive to field signals from the rotating magnetic disk which increases the sensitivity of the read head. An exemplary second embodiment employs 37 Å of iron nitride and 25 Å of nickel iron molybdenum which has a magnetization equivalent to 100 Å of nickel iron. In this example the iron nitride layer increases the magnetization while the nickel iron molybdenum layer increases the uniaxial anisotropy ($H_K$). Both of these layers increase the permeability of the flux guide as compared to the permeability of a nickel iron flux guide. In still a further embodiment of the present invention a plurality of iron nitride and nickel iron molybdenum layers are laminated with sufficient thicknesses to provide magnetization equivalent to a 100 Å thick nickel iron flux guide layer which provides the aforementioned reduced read gap and reduced uniaxial anisotropy ($H_K$).

An object of the present invention is to provide a tunnel valve sensor with a flux guide which has a more narrow read gap.

Another object is to provide a tunnel valve sensor with a flux guide which has improved magnetization.

A further object is to provide a tunnel valve sensor with a flux guide which has improved magnetization and improved uniaxial anisotropy ($H_K$).

Still another object is to provide methods for making the aforementioned flux guides for the tunnel valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
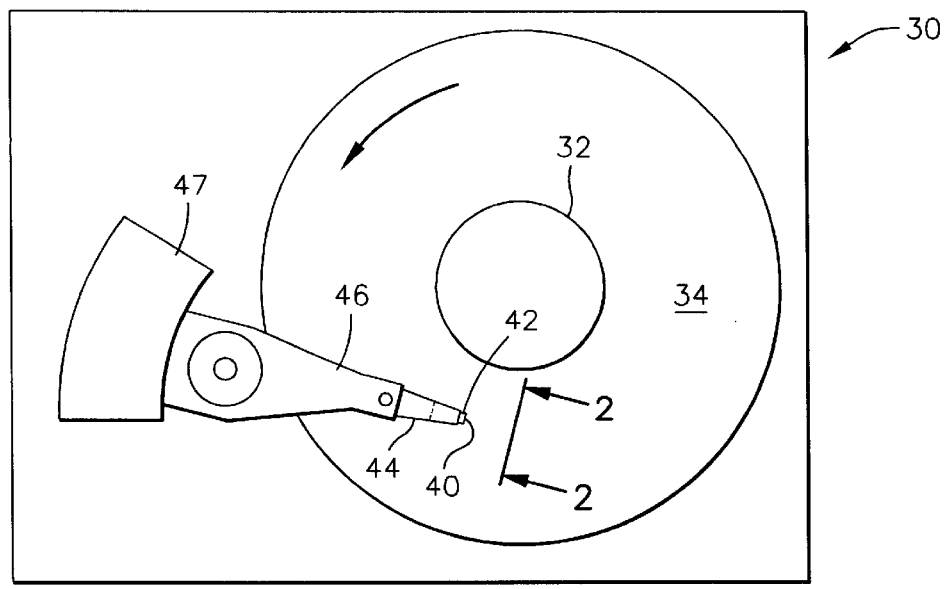
FIG. 1 is a plan view of an exemplary magnetic disk drive.
Figure 2:
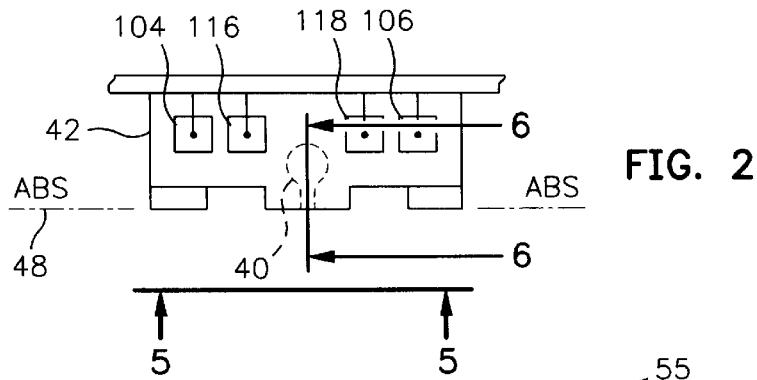
FIG. 2 is an end view of a slider with a magnetic head of the disk drive as seen in plane 2—2 of FIG. 1.
Figure 3:
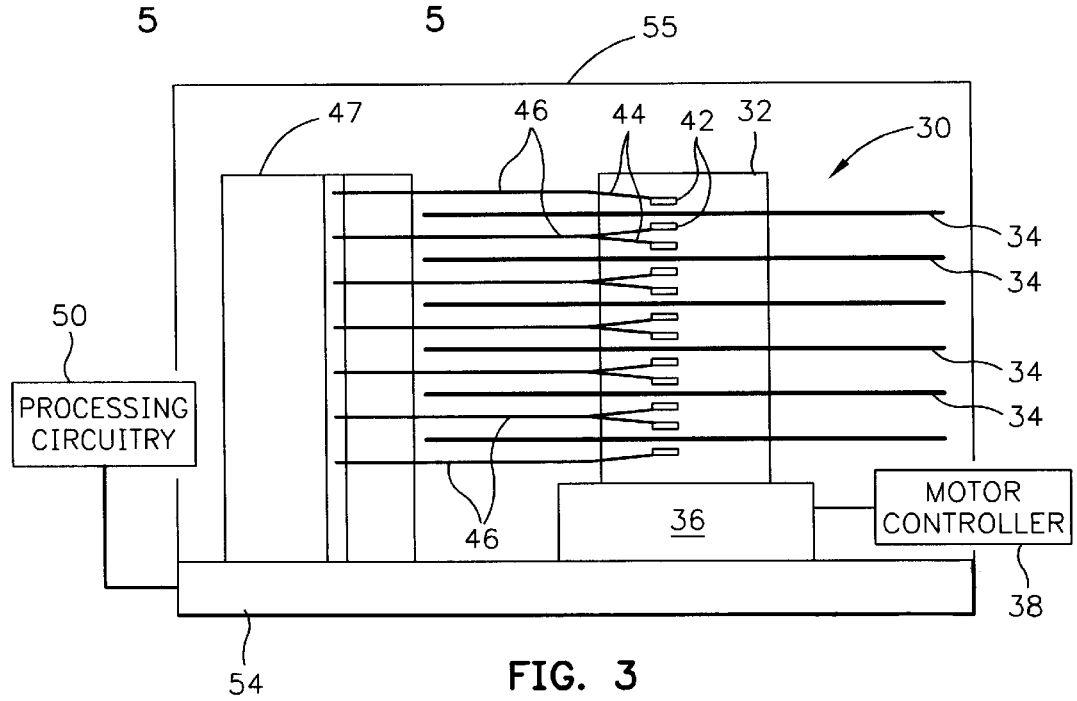
FIG. 3 is an elevation view of the magnetic disk drive wherein multiple disks and magnetic heads are employed.
Figure 4:
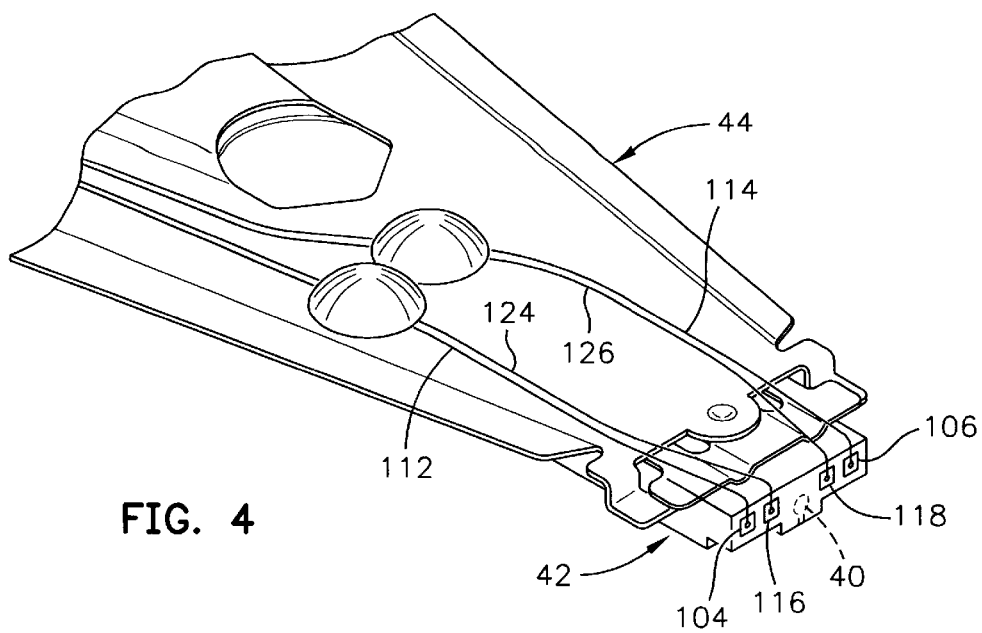
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
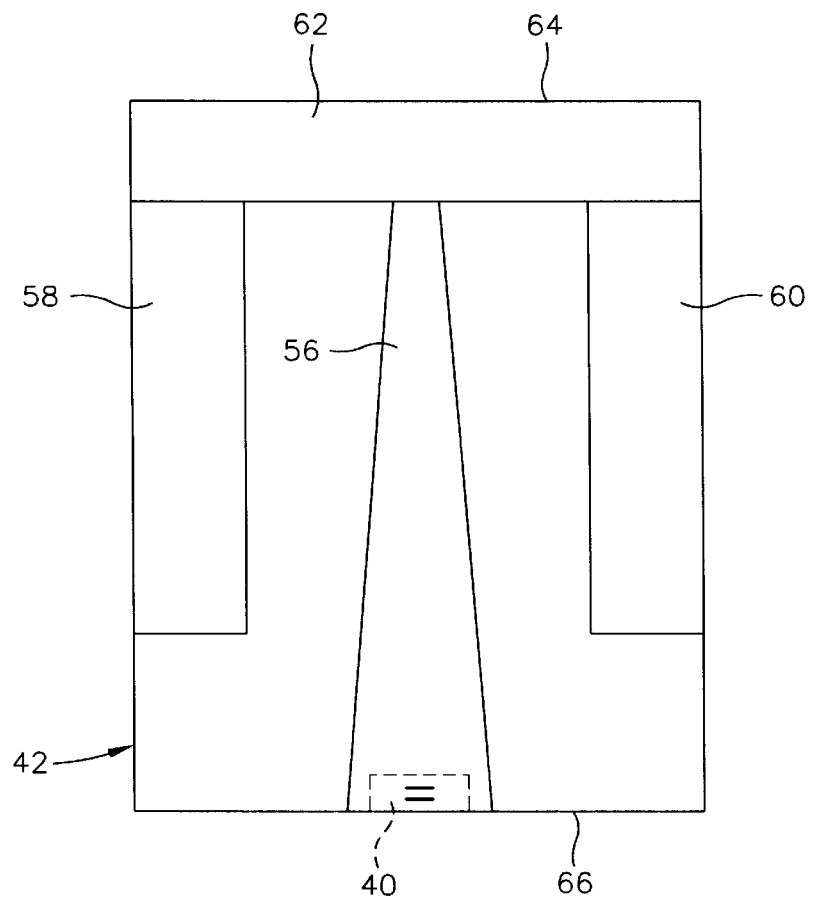
FIG. 5 is an ABS view of the slider taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
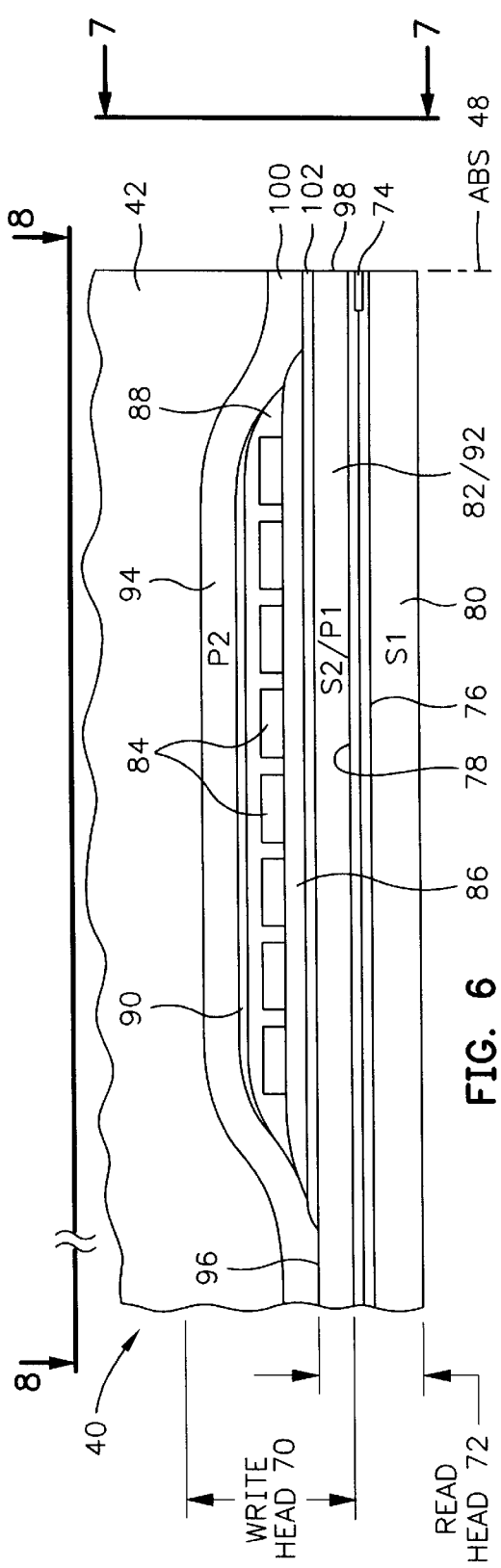
FIG. 6 is a partial view of the slider and a merged magnetic head as seen in plane 6—6 of FIG. 2.
Figure 7:
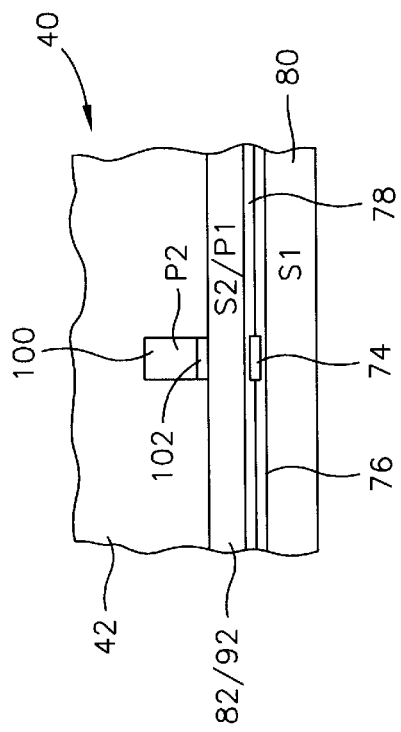
FIG. 7 is a partial ABS view of the slider taken along plane 7—7 of FIG. 6 to show the read and write elements of the merged magnetic head.
Figure 8:
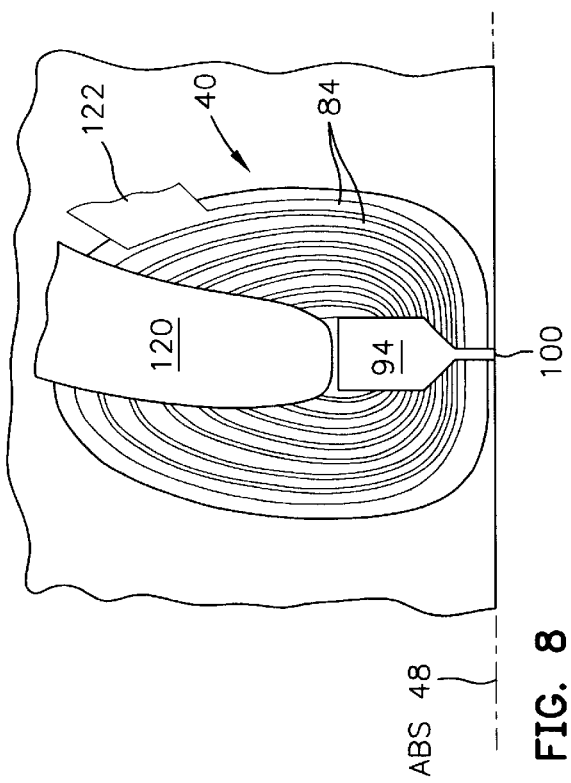
FIG. 8 is a view taken along plane 7—7 of FIG. 6 with all material above the coil layer and leads removed.

FIG. 6 is a side cross-sectional elevation view of a merged magnetic head 40, which includes a write head portion 70 and a read head portion 72, the read head portion employing a tunnel valve sensor 74 of the present invention. FIG. 7 is an ABS view of FIG. 6. The tunnel valve sensor 74 is sandwiched between ferromagnetic first and second shield layers 80 and 82. In response to external magnetic fields, the resistance of the tunnel valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel valve sensor 74 perpendicular to the planes of its film surfaces by the first and second shield layers 80 and 82 which serve as first and second leads. In a piggyback head (not shown) the second shield layer and the first pole piece layer are separate layers which are separated by a nonmagnetic isolation layer.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the tunnel valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
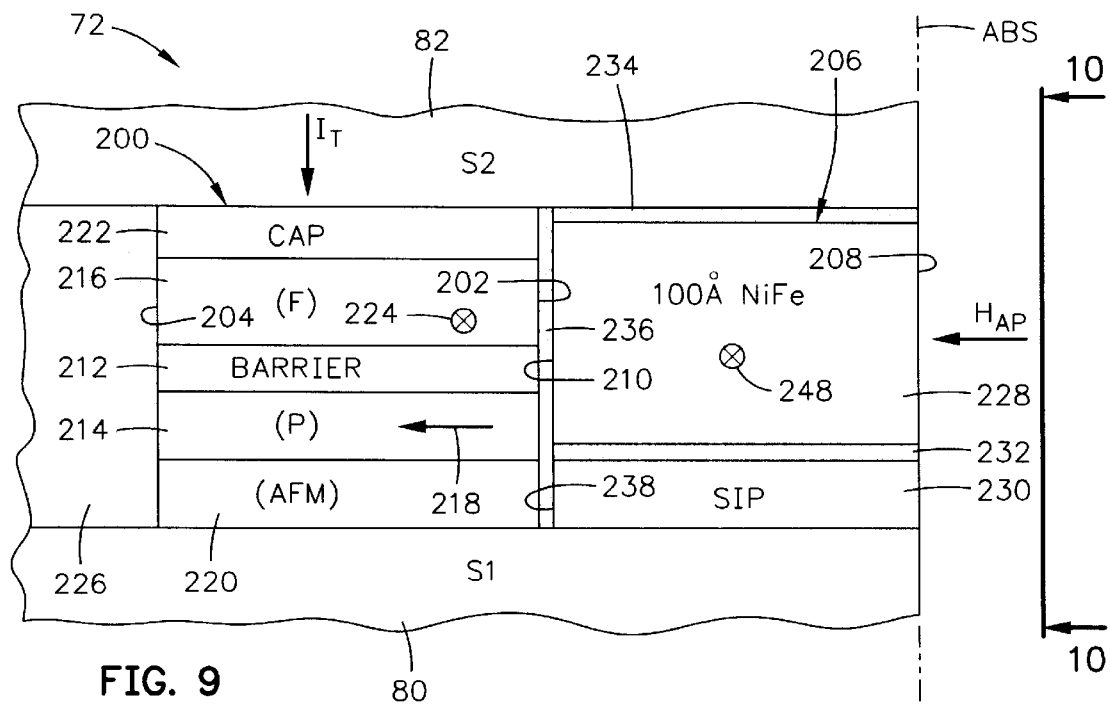
FIG. 9 is a longitudinal cross-sectional illustration of a prior art tunnel valve sensor and a prior art flux guide.

FIG. 9 is a longitudinal cross-sectional view of a prior art head 72 with a tunnel valve sensor 200 located between the first and second shield layers 80 and 82. The tunnel valve sensor 200 has front and back surfaces 202 and 204 and is recessed in the head from the ABS. A flux guide 206 has front and back surfaces 208 and 210 wherein the front surface 208 forms a portion of the ABS and the back surface 210 is magnetically coupled to the front surface 202 of the tunnel valve sensor 200.

The tunnel valve sensor has an electrically nonconductive barrier layer 212 which is located between a pinned layer (P) 214 and a free layer (F) 216. The pinned layer 214 has a magnetic moment 218 which is pinned by an antiferromagnetic (AFM) pinning layer 220 perpendicular to the ABS in a direction from left to right or from right to left, as shown in FIG. 9. A cap layer 222 may be provided on top of the free layer 216 for protecting the sensor from subsequent processing steps. The free layer 216 has a magnetic moment 224 which is oriented parallel to the ABS and to the major planes of the layers. When a field signal $H_{AP}$ from a rotating magnetic disk is sensed by the tunnel valve sensor 200 the magnetic moment 224 of the free layer rotates. When the magnetic moment 224 is rotated into the head by the field signal the magnetic moments 224 and 218 become more parallel which reduces the resistance of the sensor to a tunneling current $I_T$ and when the field signal rotates the magnetic moment 224 outwardly from the head, the magnetic moments 224 and 218 become more antiparallel which increases the resistance of the tunnel valve sensor to the tunneling current $I_T$. These resistance changes are processed as playback signals by the processing circuitry 50 in FIG. 3. The tunneling current $I_T$ may be applied to the tunnel valve sensor by the first and second shield layers 80 and 82 which are electrically conductive. The connection of the source of the tunneling current $I_T$ to the first and second shield layers is not shown. A nonmagnetic and electrically nonconductive insulation layer 226 insulates the first and second shields 80 and 82 from one another as well as from the back surface 204 of the tunnel valve sensor.

Figure 10:
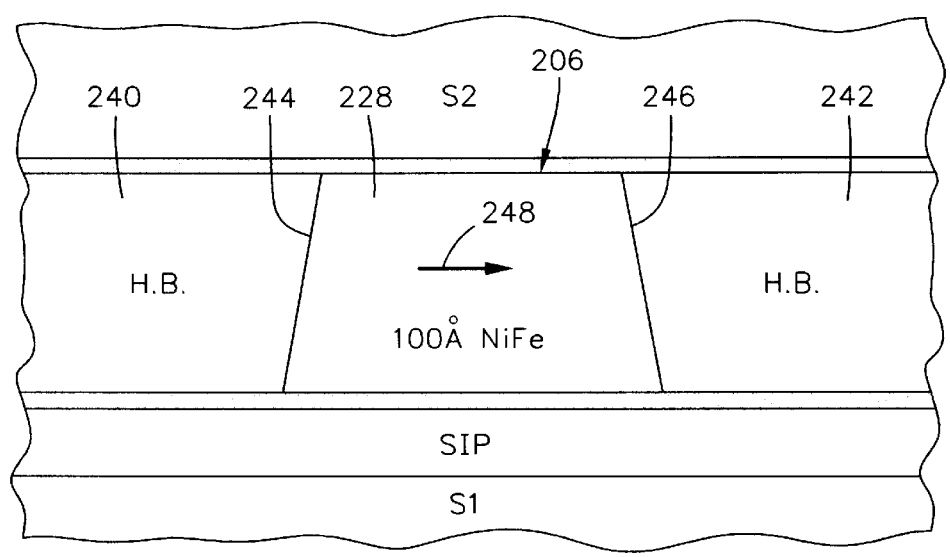
FIG. 10 is a view taken along plane 10—10 of FIG. 9.

The flux guide 206, as shown in FIGS. 9 and 10, is a prior art flux guide which employs a 100 Å thick nickel iron (NiFe) layer 228. Since the total thickness of the tunnel valve sensor 200 is typically greater than 100 Å a ferromagnetic first shield pedestal (SIP) 230 is employed on the first shield layer 80 at the ABS so that the spacing between the first shield pedestal 230 and the second shield layer 82 define the read gap of the read head 72. The width of the front surface 208 of the flux guide, as shown in FIG. 10, defines the track width of the read head. The flux guide 206 increases in width from the front surface 208 to the back surface 210 (not shown) with the back surface 210 of the flux guide being opposite the front surface 202 of the tunnel valve sensor with the front surface 202 of the tunnel valve sensor having a width which is comparable to the width of the back surface 210 of the flux guide. With this arrangement the planar surfaces of the layers of the tunnel valve sensor are large so that the resistance of these layers to the tunneling current $I_T$ is minimized for improving the efficiency of the tunnel valve sensor. It should be noted that if the tunnel valve sensor was located at the ABS without the flux guide 206 that a narrowing of the tunnel valve sensor in order to achieve a small track width would increase the resistance of the tunnel valve sensor to the tunneling current $I_T$. Accordingly, the flux guide permits a narrow track width while permitting the tunnel valve sensor to have a low resistance.

Electrically nonconductive first and second insulation layers 232 and 234 electrically insulate the nickel iron layer 228 of the flux guide from the first shield pedestal 230 and the second shield layer 82 respectively. An electrically nonconductive third insulation layer 236 insulates the back surface 210 of the flux guide from the front surface 202 of the tunnel valve sensor as well as insulating a back surface 238 of the first shield pedestal from the front surface 202 of the tunnel valve sensor. The insulation layer 236 is very thin, on the order of 8 Å, so as to permit flux transfer from the flux guide 206 to the tunnel valve sensor 200. As shown in FIG. 10, first and second hard bias layers 240 and 242 interface first and second side surfaces 244 and 246 respectively of the nickel iron layer 228 for longitudinally biasing a magnetic moment 248 of the flux guide 206. This longitudinal biasing magnetically stabilizes the magnetization of the flux guide. Further, the first and second hard bias layers 240 and 242 may be extended into the head (not shown) for longitudinally biasing the magnetic moment 224 of the free layer of the tunnel valve sensor so that the magnetization of the free layer is also stabilized. It should be noted that when an applied field ($H_{AP}$) rotates the magnetic moment 248 of the flux guide into the sensor away from the ABS that the magnetic moment 224 of the free layer is likewise rotated into the sensor away from the ABS. If the applied field ($H_{AP}$) is of an opposite polarity then the magnetic moments 248 and 224 rotate in an opposite direction. This causes the aforementioned resistance changes in the tunnel valve sensor 200 which are processed as playback signals by the processing circuitry 50 in FIG. 3.

The Invention

Figure 11:
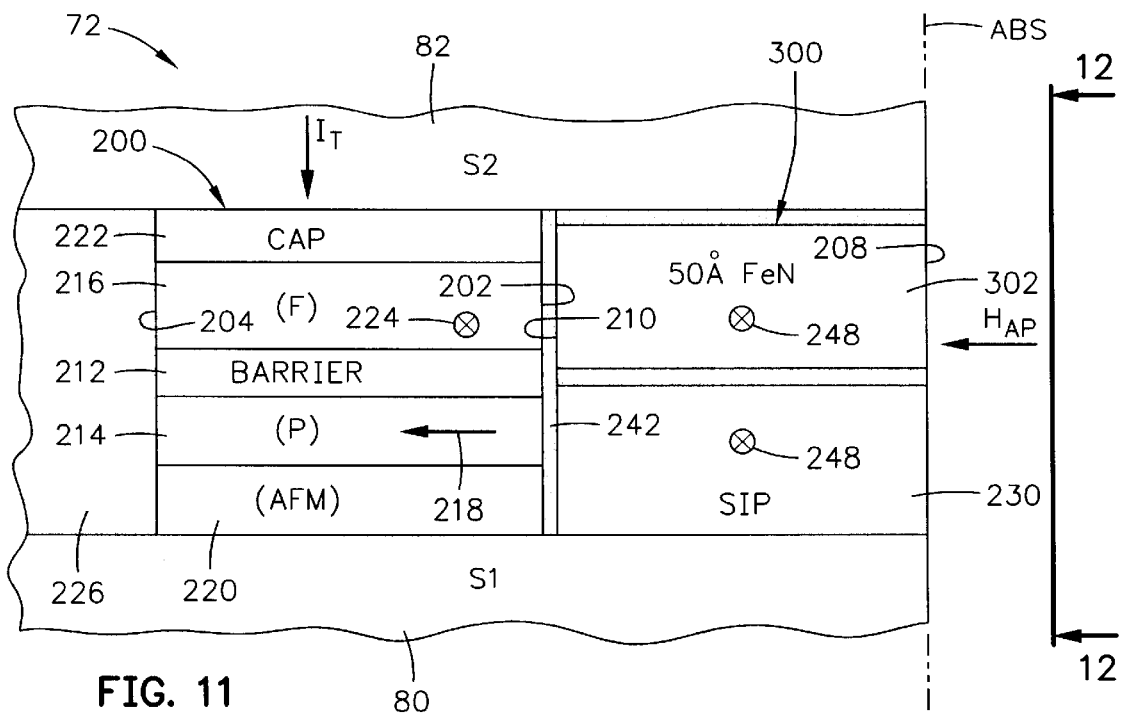
FIG. 11 is a longitudinal cross-sectional illustration of a tunnel valve sensor with a first embodiment of the present flux guide.
Figure 12:
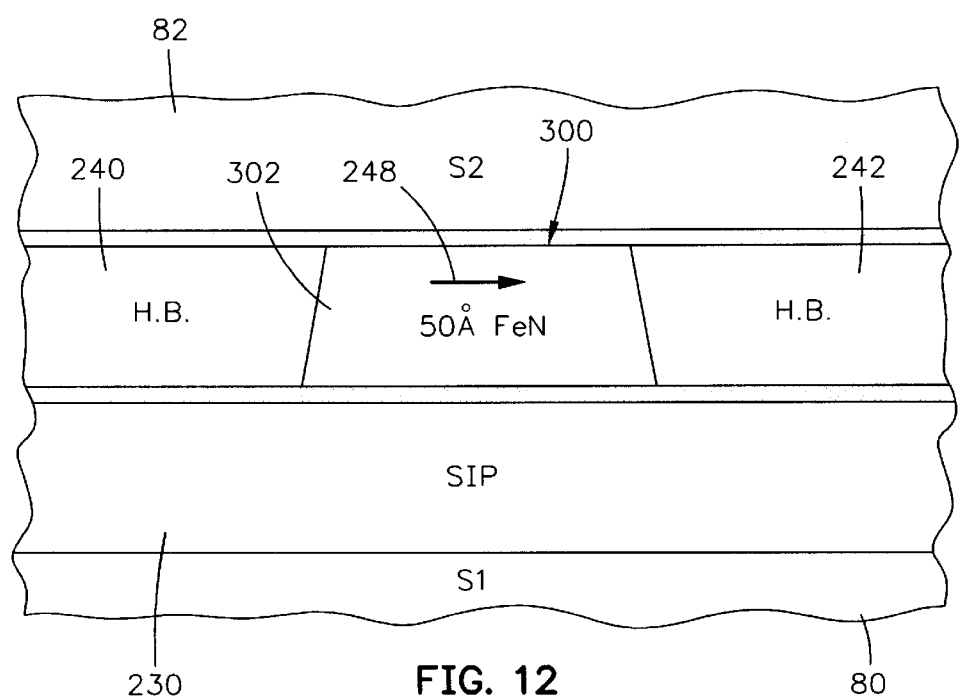
FIG. 12 is a view taken along plane 12—12 of FIG. 11.

A first embodiment of the present invention is illustrated in FIGS. 11 and 12. In this embodiment a flux guide 300 is provided which has a single iron nitride (FeN) layer 302. Iron nitride has substantially the same uniaxial anisotropy ($H_K$) as nickel iron, which uniaxial anisotropy ($H_K$) is 5 Oe. However, the magnetization (4 $\pi M_S$) of iron nitride is substantially twice the magnetization (4 $\pi M_S$) of nickel iron. Accordingly, a 50 Å thick iron nitride layer 302 provides the same magnetization (4 $\pi M_S$) as the 100 Å thick nickel iron layer 228 in FIG. 9 with the same uniaxial anisotropy ($H_K$). Accordingly, with the embodiment shown in FIGS. 11 and 12 the read gap between the first shield pedestal 230 and the second shield layer 82 has been reduced by 50 Å without a change in the sensitivity of the flux guide to field signals ($H_{AP}$) from the rotating magnetic disk.

Figure 13:
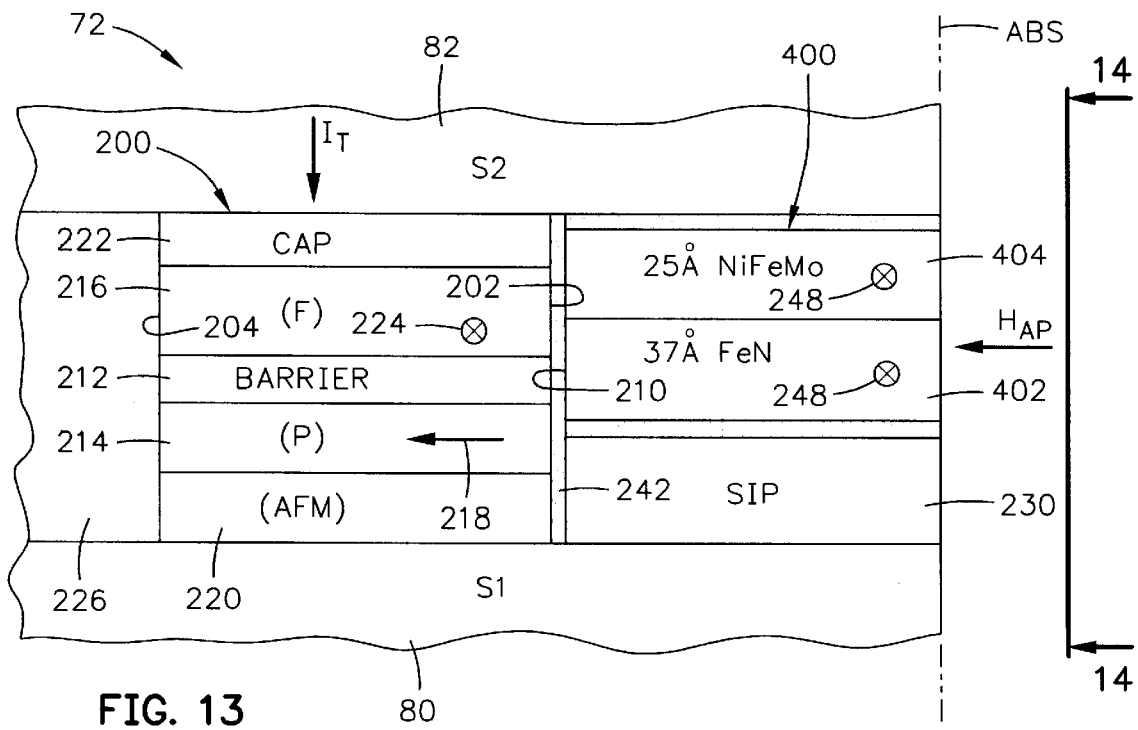
FIG. 13 is a longitudinal cross-sectional illustration of the tunnel valve sensor with a second embodiment of the present flux guide.
Figure 14:
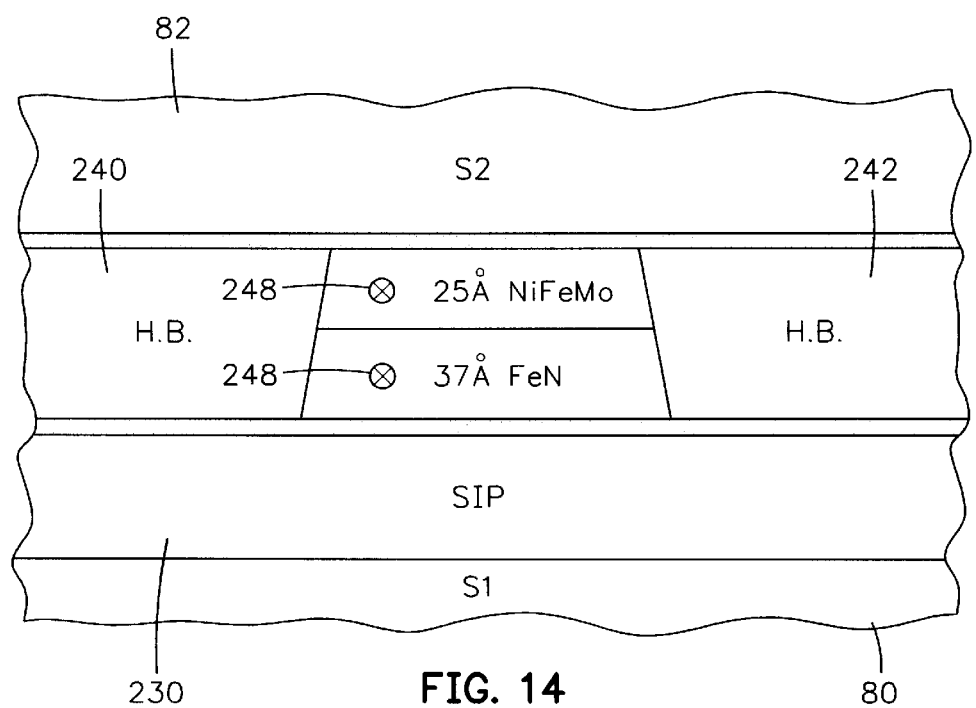
FIG. 14 is a view taken along plane 14—14 of FIG. 13.

A second embodiment of the present invention is illustrated in FIGS. 13 and 14 which employs a flux guide 400. The flux guide 400 includes a first layer 402 of iron nitride (FeN) and a second layer 404 of nickel iron molybdenum (NiFeMo). Nickel iron molybdenum has a uniaxial anisotropy ($H_K$) of about ½ Oe which is only about 10% of the uniaxial anisotropy ($H_K$) of either nickel iron or iron nitride. Accordingly, the nickel iron molybdenum is significantly more responsive to field signals ($H_{AP}$) from the rotating magnetic disk. The magnetization (4 $\pi M_S$), however, is about 50% of the magnetization (4 $\pi M_S$) of nickel iron and about 25% of the magnetization (4 $\pi M_S$) of iron nitride. Exemplary thicknesses of the layers 402 and 404 of the flux guide 400 in FIGS. 13 and 14 in order to obtain an equivalent magnetization (4 $\pi M_S$) of a 100 Å thick nickel iron flux guide layer 228 in FIGS. 9 and 10 are 37 Å of iron nitride (FeN) for the layer 402 and 25 Å of nickel iron molybdenum (NiFeMo) for the layer 404. The gap reduction between the first shield pedestal 230 and the second shield layer 82 in FIGS. 13 and 14 is 38 Å as compared to 50 Å for the reduction in gap in the prior art embodiment shown in FIGS. 9 and 10. However, the flux guide 400 in FIGS. 13 and 14 has a significantly improved lower uniaxial anisotropy ($H_K$) which improves the responsiveness (sensitivity) of the magnetic moment 248 of the flux guide 400 to field signals ($H_{AP}$) from the rotating magnetic disk. Accordingly, a lamination of iron nitride and nickel iron molybdenum layers, as shown in FIGS. 13 and 14, is a preferred embodiment of the present invention, as compared to the first embodiment of the present invention illustrated in FIGS. 11 and 12. As shown in the preferred embodiment, the thickness of the iron nitride (FeN) layer 402 is thicker than the thickness of the nickel iron molybdenum (NiFeMo) layer 404.

Figure 15:
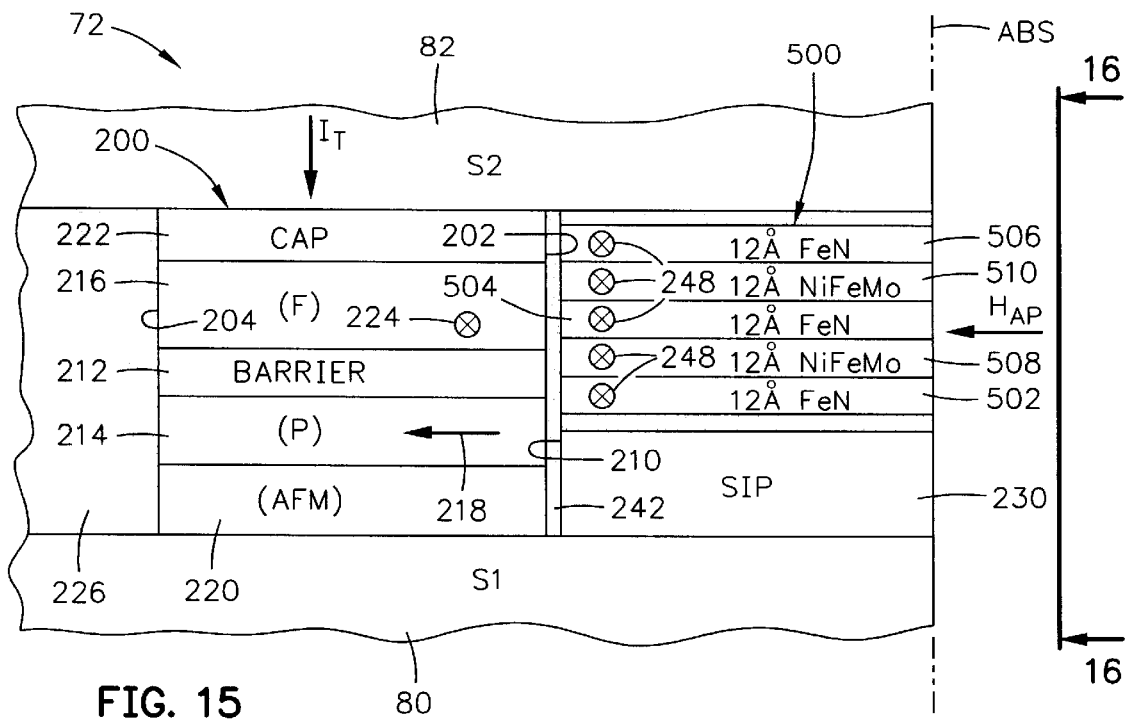
FIG. 15 is a longitudinal cross-sectional illustration of the tunnel valve sensor with a third embodiment of the present flux guide.
Figure 16:
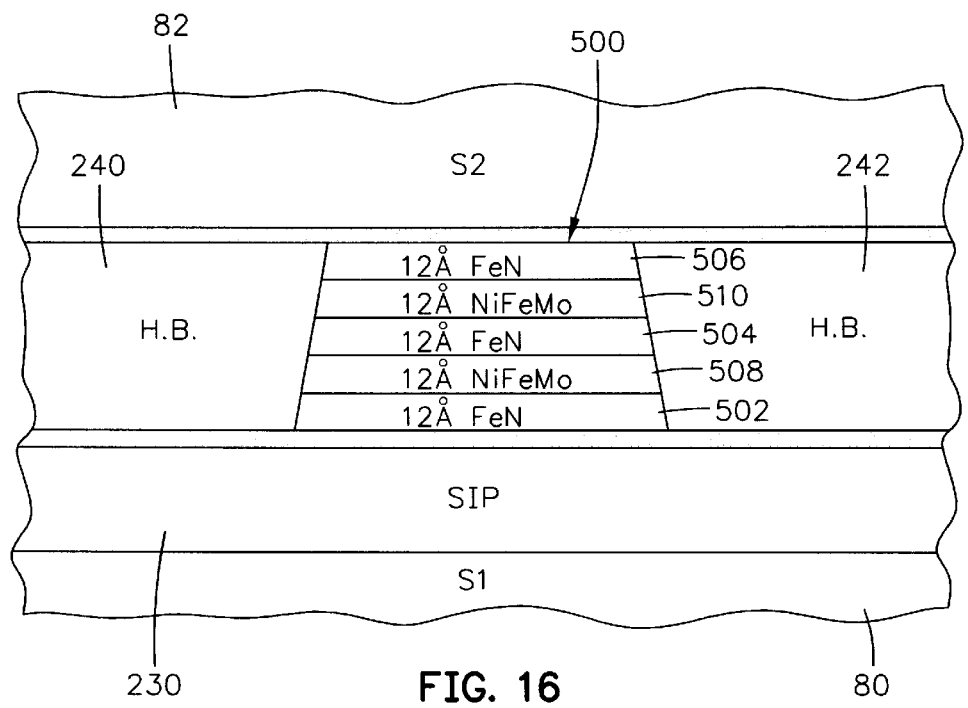
FIG. 16 is a view taken along plane 16—16 of FIG. 15.

A third embodiment of the present invention is illustrated in FIGS. 15 and 16. In this embodiment a flux guide 500 employs multiple layers of iron nitride 502, 504 and 506 and multiple layers of nickel iron molybdenum (NiFeMo) 508 and 510 which are laminated in an alternating relationship. Each of the layers may be 12 Å thick with the outside layers 502 and 506 being iron nitride (FeN). Accordingly, the total thickness of the iron nitride layers 502, 504 and 506 is 36 Å and the total thickness of the nickel iron molybdenum (NiFeMo) layers 508 and 510 is 24 Å. This total thickness compares to the thicknesses of the iron nitride (FeN) and nickel iron molybdenum (NiFeMo) layers 402 and 404 in FIGS. 13 and 14. The advantage of the additional lamination of layers in FIGS. 15 and 16 over the layers in FIGS. 13 and 14 is that the magnetization (4 $\pi M_S$) and the uniaxial anisotropy ($H_K$) of the flux guide 500 will be more uniform than the magnetization (4 $\pi M_S$) and the uniaxial anisotropy ($H_K$) of the flux guide in FIGS. 13 and 14.

Discussion

The preferred composition for the iron nitride (FeN) is $Fe_{95}N_5$ and the preferred composition for the nickel iron molybdenum (NiFeMo) is $Ni_{78}Fe_{17}Mo_5$. It should be noted that with the embodiment of the invention shown in FIGS. 11 and 12 the read gap is reduced while the sensitivity to the field signals ($H_{AP}$) is the same as a nickel iron flux guide. However, with the preferred invention shown in FIGS. 13–16, the read gap is not only decreased but the sensitivity to the flux guide is improved.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly which has an air bearing surface (ABS), comprising:

a read head including:
   a tunnel valve sensor having front and back walls wherein the front wall is recessed from the ABS and is located between the ABS and the back wall;
   a flux guide having front and back walls wherein the front wall is located at the ABS and the back wall is located between the ABS and the front wall of the tunnel valve sensor;
   an electrically nonconductive first insulation layer located between and interfacing the front wall of the tunnel valve sensor and the back wall of the flux guide; and
   the flux guide being a lamination of iron nitride (FeN) and nickel iron molybdenum (NiFeMo) layers.

2. A magnetic head assembly as claimed in claim 1 wherein the tunnel valve sensor includes:
   a ferromagnetic pinned layer that has a magnetic moment;
   an antiferromagnetic pinning layer exchange coupled to the pinned layer for pinning the magnetic moment of the pinned layer;
   a ferromagnetic free layer which has a magnetic moment; and
   a nonmagnetic electrically insulative barrier layer located between the free layer and the pinned layer.

3. A magnetic head assembly as claimed in claim 2 wherein the head assembly further includes:
   ferromagnetic first and second shield layers;
   the tunnel valve sensor and the flux guide being located between the first and second shield layers; and
   electrically nonconductive second and third insulation layers located between the first shield layer and the flux guide and between the second shield layer and the flux guide respectively.

4. A magnetic head assembly as claimed in claim 1 wherein the lamination includes a plurality of iron nitride (FeN) and a plurality of nickel iron molybdenum (NiFeMo) layers.

5. A magnetic head assembly as claimed in claim 3 wherein the magnetic head assembly further comprises:
   a write head including:
   ferromagnetic first and second pole piece layers that have a yoke portion located between a pole tip portion and a back gap portion;
   a nonmagnetic write gap layer located between the pole tip portions of the first and second pole piece layers;
   an insulation stack with at least one coil layer embedded therein located between the yoke portions of the first and second pole piece layers; and
   the first and second pole piece layers being connected at their back gap portions.

6. A magnetic head assembly which has an air bearing surface (ABS), comprising:

a read head including:
   a tunnel valve sensor having front and back walls wherein the front wall is recessed from the ABS and is located between the ABS and the back wall;
   a flux guide having front and back walls wherein the front wall is located at the ABS and the back wall is located between the ABS and the front wall of the tunnel valve sensor;
   an electrically nonconductive first insulation layer located between and interfacing the front wall of the tunnel valve sensor and the back wall of the flux guide;
   ferromagnetic first and second shield layers;
   the tunnel valve sensor and the flux guide being located between the first and second shield layers; and electrically nonconductive second and third insulation layers located between the first shield layer and the flux guide and between the second shield layer and the flux guide respectively;

the tunnel value sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment;
a nonmagnetic electrically insulative barrier layer located between the free layer and the pinned layer;
the flux guide consisting of one iron nitride (FeN) layer and one nickel molybdenum (NiFeMo) layer.

7. A magnetic head assembly as claimed in claim 6 wherein a thickness of the iron nitride (FeN) layer is thicker than a thickness of the nickel iron molybdenum (NiFeMo) layer.

8. A magnetic head assembly which has an air bearing surface (ABS), comprising:
a read head including:
a tunnel valve sensor having front and back walls wherein the front wall is recessed from the ABS and is located between the ABS and the back wall;
a flux guide having front and back walls wherein the front wall is located at the ABS and the back wall is located between the ABS and the front wall of the tunnel valve sensor;
an electrically nonconductive first insulation layer located between and interfacing the front wall of the tunnel valve sensor and the back wall of the flux guide;
ferromagnetic first and second shield layers;
the tunnel valve sensor and the flux guide being located between the first and second shield layers; and
electrically nonconductive second and third insulation layers located between the first shield layer and the flux guide and between the second shield layer and the flux guide respectively;
the tunnel valve sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment;
a nonmagnetic electrically insulative barrier layer located between the free layer and the pinned layer;
the flux guide consisting of three iron nitride (FeN) and two nickel iron molybdenum (NiFeMo) alternating layers.

9. A magnetic head assembly which has an air bearing surface (ABS), comprising:
a read head including:
a tunnel valve sensor having front and back walls wherein the front wall is recessed from the ABS and is located between the ABS and the back wall;
a flux guide having front and back walls wherein the front wall is located at the ABS and the back wall is located between the ABS and the front wall of the tunnel valve sensor;
an electrically nonconductive first insulation layer located between and interfacing the front wall of the tunnel valve sensor and the back wall of the flux guide;
ferromagnetic first and second shield layers;
the tunnel valve sensor and the flux guide being located between the first and second shield layers; and
electrically nonconductive second and third insulation layers located between the first shield layer and the flux guide and between the second shield layer and the flux guide respectively;
the tunnel valve sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment;
a nonmagnetic electrically insulative barrier layer located between the free layer and the pinned layer;
the flux guide consisting of one iron nitride (FeN) layer and one nickel molybdenum (NiFeMo) layer;
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

10. A magnetic head assembly as claimed in claim 9 wherein a thickness of the iron nitride (FeN) layer is thicker than a thickness of the nickel iron molybdenum (NiFeMo) layer.

11. A magnetic head assembly which has an air bearing surface (ABS), comprising:
a read head including:
a tunnel valve sensor having front and back walls wherein the front wall is recessed from the ABS and is located between the ABS and the back wall;
a flux guide having front and back walls wherein the front wall is located at the ABS and the back wall is located between the ABS and the front wall of the tunnel valve sensor;
an electrically nonconductive first insulation layer located between and interfacing the front wall of the tunnel valve sensor and the back wall of the flux guide;
ferromagnetic first and second shield layers;
the tunnel valve sensor and the flux guide being located between the first and second shield layers; and
electrically nonconductive second and third insulation layers located between the first shield layer and the flux guide and between the second shield layer and the flux guide respectively;
the tunnel valve sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment;
a nonmagnetic electrically insulative barrier layer located between the free layer and the pinned layer;
the flux guide consisting of three iron nitride (FeN) and two nickel iron molybdenum (NiFeMo) alternating layers;

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

12. A magnetic disk drive including at least one magnetic head assembly that has an a write head, a read head and an air bearing surface (ABS) comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers;
the first and second pole piece layers being connected at their back gap portions; and
the read head including:
a tunnel valve sensor having front and back walls wherein the front wall is recessed from the ABS and is located between the ABS and the back wall;
a flux guide having front and back walls wherein the front wall is located at the ABS and the back wall is located between the ABS and the front wall of the tunnel valve sensor;
an electrically nonconductive first insulation layer located between and interfacing the front wall of the tunnel valve sensor and the back wall of the flux guide; and
the flux guide being a lamination of iron nitride (FeN) and nickel iron molybdenum (NiFeMo) layers;
a ferromagnetic first shield layer;
the tunnel valve sensor and the flux guide being located between the first shield layer and the first pole piece layer; and
electrically nonconductive second and third insulation layers located between the first shield layer and the flux guide and between the second shield layer and the flux guide respectively;
the tunnel valve sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment; and
a nonmagnetic electrically insulative barrier layer located between the free layer and the pinned layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

13. A magnetic disk drive as claimed in claim 12 wherein the flux guide consists of one iron nitride (FeN) layer and one nickel iron molybdenum (NiFeMo) layer.

14. A magnetic disk drive as claimed in claim 13 wherein a thickness of the iron nitride (FeN) layer is thicker than a thickness of the nickel iron molybdenum (NiFeMo) layer.

15. A magnetic disk drive as claimed in claim 12 wherein the flux guide consists of three iron nitride (FeN) and two nickel iron molybdenum (NiFeMo) alternating layers.

16. A method of making a magnetic head assembly which has an air bearing surface (ABS), comprising the steps of:
making a read head including the steps of:
forming a tunnel valve sensor having front and back walls wherein the front wall is recessed from the ABS and is located between the ABS and the back wall;
forming a flux guide having front and back walls wherein the front wall is located at the ABS and the back wall is located between the ABS and the front wall of the tunnel valve sensor;
forming an electrically nonconductive first insulation layer between and interfacing the front wall of the tunnel valve sensor and the back wall of the flux guide; and
forming the flux guide with a lamination of iron nitride (FeN) and nickel iron molybdenum (NiFeMo) layers.

17. A method as claimed in claim 16 wherein the tunnel valve sensor is made comprising the steps of:
forming a ferromagnetic pinned layer that has a magnetic moment;
forming an antiferromagnetic pinning layer exchange coupled to the pinned layer for pinning the magnetic moment of the pinned layer;
forming a ferromagnetic free layer which has a magnetic moment; and
forming a nonmagnetic electrically insulative barrier layer between the free layer and the pinned layer.

18. A method as claimed in claim 17 wherein a making of the read head further includes the steps of:
forming ferromagnetic first and second shield layers;
forming the tunnel valve sensor and the flux guide between the first and second shield layers; and
forming electrically nonconductive second and third insulation layers between the first shield layer and the flux guide and between the second shield layer and the flux guide respectively.

19. A method as claimed in claim 18 wherein the making of the magnetic head assembly further comprises the steps of:
forming a write head including the steps of:
forming ferromagnetic first and second pole piece layers that have a yoke portion located between a pole tip portion and a back gap portion;
forming a nonmagnetic write gap layer between the pole tip portions of the first and second pole piece layers;
forming an insulation stack with at least one coil layer embedded therein between the yoke portions of the first and second pole piece layers; and
connecting the first and second pole piece layers at their back gap portions.

20. A method of making a magnetic head assembly as claimed in claim 16 wherein the lamination is formed of a plurality of iron nitride (FeN) and a plurality of nickel iron molybdenum (NiFeMo) layers.

21. A method of making a magnetic head assembly which has an air bearing surface (ABS), comprising the steps of:
    making a read head including the steps of:
        forming a tunnel valve sensor having front and back walls wherein the front wall is recessed from the ABS and is located between the ABS and the back wall;
        forming a flux guide having front and back walls wherein the front wall is located at the ABS and the back wall is located between the ABS and the front wall of the tunnel valve sensor;
        forming an electrically nonconductive first insulation layer between and interfacing the front wall of the tunnel valve sensor and the back wall of the flux guide;
        forming ferromagnetic first and second shield layers;
        forming the tunnel valve sensor and the flux guide between the first and second shield layers; and
        forming electrically nonconductive second and third insulation layers between the first shield layer and the flux guide and between the second shield layer and the flux guide respectively;
    forming the tunnel valve sensor comprising the steps of:
        forming a ferromagnetic pinned layer that has a magnetic moment;
        forming an antiferromagnetic pinning layer exchange coupled to the pinned layer for pinning the magnetic moment of the pinned layer;
        forming a ferromagnetic free layer which has a magnetic moment; and
        forming a nonmagnetic electrically insulative barrier layer between the free layer and the pinned layer; and
    forming the flux guide consisting of one iron nitride (FeN) layer and one nickel molybdenum (NiFeMo) layer.

22. A method as claimed in claim 21 wherein a thickness of the iron nitride (FeN) layer is formed thicker than a thickness of the nickel iron molybdenum (NiFeMo) layer.

23. A method of making a magnetic head assembly which has an air bearing surface (ABS), comprising the steps of:
    making a read head including the steps of:
        forming a tunnel valve sensor having front and back walls wherein the front wall is recessed from the ABS and is located between the ABS and the back wall;
        forming a flux guide having front and back wails wherein the front wall is located at the ABS and the back wall is located between the ABS and the front wall of the tunnel valve sensor;
        forming an electrically nonconductive first insulation layer between and interfacing the front wall of the tunnel valve sensor and the back wail of the flux guide;
        forming ferromagnetic first and second shield layers;
        forming the tunnel valve sensor and the flux guide between the first and second shield layers; and
        forming electrically nonconductive second and third insulation layers between the first shield layer and the flux guide and between the second shield layer and the flux guide respectively;
    forming the tunnel valve sensor comprising the steps of:
        forming a ferromagnetic pinned layer that has a magnetic moment;
        forming an antiferromagnetic pinning layer exchange coupled to the pinned layer for pinning the magnetic moment of the pinned layer;
        forming a ferromagnetic free layer which has a magnetic moment; and
        forming a nonmagnetic electrically insulative barrier layer between the free layer and the pinned layer; and
    forming the flux guide consisting of three iron nitride (FeN) and two nickel iron molybdenum (NiFeMo) alternating layers.

24. A method of making a magnetic head assembly which has an air bearing surface (ABS), comprising the steps of:
    making a read head including the steps of:
        forming a tunnel valve sensor having front and back walls wherein the front wall is recessed from the ABS and is located between the ABS and the back wall;
        forming a flux guide having front and back walls wherein the front wall is located at the ABS and the back wall is located between the ABS and the front wall of the tunnel valve sensor;
        forming an electrically nonconductive first insulation layer between and interfacing the front wall of the tunnel valve sensor and the back wall of the flux guide;
        forming ferromagnetic first and second shield layers;
        forming the tunnel valve sensor and the flux guide between the first and second shield layers; and
        forming electrically nonconductive second and third insulation layers between the first shield layer and the flux guide and between the second shield layer and the flux guide respectively;
    forming the tunnel valve sensor comprising the steps of:
        forming a ferromagnetic pinned layer that has a magnetic moment;
        forming an antiferromagnetic pinning layer exchange coupled to the pinned layer for pinning the magnetic moment of the pinned layer;
        forming a ferromagnetic free layer which has a magnetic moment; and
        forming a nonmagnetic electrically insulative barrier layer between the free layer and the pinned layer;
    forming the flux guide consisting of one iron nitride (FeN) layer and one nickel molybdenum (NiFeMo) layer;
    forming a write head including the steps of:
        forming ferromagnetic first and second pole piece layers that have a yoke portion located between a pole tip portion and a back gap portion;
        forming a nonmagnetic write gap layer between the pole tip portions of the first and second pole piece layers;
        forming an insulation stack with at least one coil layer embedded therein between the yoke portions of the first and second pole piece layers; and
        connecting the first and second pole piece layers at their back gap portions.

25. A method as claimed in claim 24 wherein a thickness of the iron nitride (FeN) layer is formed thicker than a thickness of the nickel iron molybdenum (NiFeMo) layer.

26. A method of making a magnetic head assembly which has an air bearing surface (ABS), comprising the steps of:
    making a read head including the steps of:
        forming a tunnel valve sensor having front and back walls wherein the front wall is recessed from the ABS and is located between the ABS and the back wall;

forming a flux guide having front and back walls wherein the front wall is located at the ABS and the back wall is located between the ABS and the front wall of the tunnel valve sensor;

forming an electrically nonconductive first insulation layer between and interfacing the front wall of the tunnel valve sensor and the back wall of the flux guide;

forming ferromagnetic first and second shield layers;

forming the tunnel valve sensor and the flux guide between the first and second shield layers; and forming electrically nonconductive second and third insulation layers between the first shield layer and the flux guide and between the second shield layer and the flux guide respectively;

forming the tunnel valve sensor comprising the steps of:

forming a ferromagnetic pinned layer that has a magnetic moment;

forming an antiferromagnetic pinning layer exchange coupled to the pinned layer for pinning the magnetic moment of the pinned layer;

forming a ferromagnetic free layer which has a magnetic moment; and forming a nonmagnetic electrically insulative barrier layer between the free layer and the pinned layer;

forming the flux guide consisting of three iron nitride (FeN) and two nickel iron molybdenum (NiFeMo) alternating layers;

forming a write head including the steps of:

forming ferromagnetic first and second pole piece layers that have a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions.

* * * * *